United States Patent
George, Jr.

(10) Patent No.: US 6,245,128 B1
(45) Date of Patent: Jun. 12, 2001

(54) PROCESS FOR THE RECLAMATION OF SPENT ALKANOLAMINE SOLUTION

(75) Inventor: Joseph T. George, Jr., Beaumont, TX (US)

(73) Assignee: Mobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/333,196

(22) Filed: Jun. 15, 1999

(51) Int. Cl.[7] ................................................. B01D 53/14
(52) U.S. Cl. ............................. 95/186; 95/187; 95/190; 95/235; 95/236; 210/662; 210/670; 210/673; 210/677; 210/681; 210/683
(58) Field of Search .................................. 210/662, 670, 210/673, 679, 677, 683, 681; 95/235, 236, 186, 187, 188, 189, 190, 195, 196, 205, 206

(56) References Cited

U.S. PATENT DOCUMENTS

| | | | |
|---|---|---|---|
| 2,797,188 | 6/1957 | Taylor et al. ........................ | 196/32 |
| 4,387,026 | 6/1983 | Woolacott . | |
| 4,477,419 | 10/1984 | Pearce et al. . | |
| 4,707,347 | 11/1987 | Vajna er al. . | |
| 4,795,565 | 1/1989 | Yan ....................................... | 210/669 |
| 4,970,344 | 11/1990 | Keller .................................... | 564/497 |
| 5,006,258 | 4/1991 | Veatch et al. ......................... | 210/677 |
| 5,045,291 | 9/1991 | Keller . | |
| 5,108,551 | 4/1992 | Yan . | |
| 5,137,702 | 8/1992 | Yan . | |
| 5,162,084 | 11/1992 | Cummings et al. .................. | 210/662 |
| 5,190,662 | * 3/1993 | Keller et al. ......................... | 210/673 |
| 5,208,164 | 5/1993 | Cummings . | |
| 5,268,155 | * 12/1993 | Yan ....................................... | 210/683 |
| 5,277,822 | * 1/1994 | Higgins ................................. | 210/673 |
| 5,292,493 | * 3/1994 | Audeh et al. ......................... | 210/683 |
| 5,368,818 | * 11/1994 | Cummings et al. .................. | 210/670 |
| 5,393,505 | 2/1995 | Audeh . | |
| 5,607,594 | * 3/1997 | Pohl et al. ............................ | 210/677 |
| 5,788,864 | 8/1998 | Coberly et al. ....................... | 210/670 |
| 5,846,503 | 12/1998 | Yan . | |
| 6,071,484 | * 6/2000 | Dingman, Jr. et al. .............. | 210/669 |

FOREIGN PATENT DOCUMENTS

WO96/26007   8/1996   (WO) .

OTHER PUBLICATIONS

Kohl and Reisenfeld, *Gas Purification*, Gulf Publishing Company, Houston, 1979, pp. 91–105.
Butwell, Kubec and Sigmund, "Alkanolamine Treating," *Hydrocarbon Processing*, Mar. 1982, pp 108–116.

* cited by examiner

Primary Examiner—Duane S. Smith
(74) Attorney, Agent, or Firm—Jay Simon; Norby L. Foss

(57) ABSTRACT

A process for the reclamation of spent aqueous alkanolamine solutions by contacting a spent aqueous alkanolamine solution with a strong base ion exchange resin for time sufficient to sorb from the aqueous alkanolamine solution at least a portion of the accumulated ions and after a high concentration of ions accumulate on the resin, regenerating the strong base ion exchange resin by: a) purging the resin with water or nitrogen, b) contacting the strong base ion exchange resin with a sodium chloride solution for a time sufficient to remove the ions, c) purging the resin to remove the sodium chloride solution, d) contacting the resin with an alkali metal hydroxide solution, preferably sodium hydroxide, for a time sufficient to convert the resin to a substantially hydroxide form; and e) purging the resin, wherein the ion sorption capacity of the resin is maintained at a substantially constant value.

10 Claims, 9 Drawing Sheets

DEA Purge using Water
Strong Base Type 1
PA-316

Figure 4

Mass Balance for DEA HSS ion
exchange resin DIAION PA 316

| Thiocyanate | Pass 1 | Pass 2 | Pass 3 | Pass 4 | Pass 5 | Average |
|---|---|---|---|---|---|---|
| Grams on | 77.7 | 64.9 | 67.3 | 64.5 | 64.7 | 67.82 |
| Grams off | 29.8 | 98.8 | 47.3 | 68.5 | 59.3 | 60.74 |
|  |  |  |  |  |  |  |
| Grams/ft$^3$ on | 1425.69 | 1190.83 | 1234.86 | 1183.49 | 1187.16 | 1244.40 |
| Grams/ft$^3$ off | 546.79 | 1812.84 | 867.89 | 1256.88 | 1088.07 | 1114.50 |
|  |  |  |  |  |  |  |
| lb-moles/ft$^3$ on | 0.05 | 0.05 | 0.05 | 0.04 | 0.05 | 0.04 |
| lb-moles/ft$^3$ off | 0.02 | 0.07 | 0.03 | 0.05 | 0.04 | 0.04 |
|  |  |  |  |  |  |  |
| lb-moles/250ft$^3$ on | 13.55 | 11.32 | 11.73 | 11.25 | 11.28 | 11.82 |
| lb-moles/250f$^3$ off | 5.20 | 17.23 | 8.25 | 11.94 | 10.34 | 10.59 |
|  |  |  |  |  |  |  |
| % Removed | 38.35 | 152.23 | 70.28 | 106.20 | 91.65 | 89.56 |

Figure 7

| On/Off Column (ppm) | | | Bed Vol (cu.ft) = 0.004944 | | | | | | | |
|---|---|---|---|---|---|---|---|---|---|---|
| | Feed | Acetate | Form | SCN | C1 | | | | | |
| | | ppmw | ppmw | ppmw | ppmw | | | | | |
| | | 1997 | 18547 | 610 | 1739 | | | | | |
| ON | | Acetate | Form. | SCN | C1 | Acetate | form. | SCN | C1 | Total/pass | Avg. Total (lb) |
| (ppm) | | ppmw | ppmw | ppmw | ppmw | grams | grams | grams | grams | grams | 0.018 |
| PA412 | 1 | 1047.68 | 12296.04 | 610.00 | 1606.29 | 0.54 | 6.39 | 0.32 | 0.84 | 8.09 | |
| | 2 | 1174.54 | 11709.47 | 610.00 | 1739.00 | 0.61 | 6.09 | 0.32 | 0.90 | 7.92 | PA412 |
| | 3 | 1081.86 | 12509.36 | 610.00 | 1739.00 | 0.56 | 6.50 | 0.32 | 0.90 | 8.29 | Capacity |
| | 4 | 1103.37 | 11612.05 | 610.00 | 1739.00 | 0.57 | 6.04 | 0.32 | 0.90 | 7.83 | (lb./cu.ft.) |
| | | | | | Avg.g | 0.57 | 6.26 | 0.32 | 0.89 | 8.03 | 3.582 |
| | | Acetate | Form. | SCN | C1 | Acetate | form. | SCN | C1 | Total/pass | Avg. Total (lb) |
| | | ppmw | ppmw | ppmw | ppmw | grams | grams | grams | grams | grams | 0.016 |
| PA408 | 1 | 966.11 | 9994.64 | 610.00 | 1739.00 | 0.50 | 5.20 | 0.32 | 0.90 | 6.92 | |
| | 2 | 1226.54 | 11339.61 | 610.00 | 1739.00 | 0.64 | 5.90 | 0.32 | 0.90 | 7.76 | PA408 |
| | 3 | 1038.83 | 9662.23 | 610.00 | 1739.00 | 0.54 | 5.02 | 0.32 | 0.90 | 6.79 | Capacity |
| | 4 | 1104.41 | 9527.87 | 610.00 | 1739.00 | 0.57 | 4.95 | 0.32 | 0.90 | 6.75 | (lb./cu.ft.) |
| | | | | | Avg.g | 0.56 | 5.27 | 0.32 | 0.90 | 7.05 | 3.145 |
| | | Acetate | Form. | SCN | C1 | Acetate | form. | SCN | C1 | Total/pass | Avg. Total (lb) |
| | | ppmw | ppmw | ppmw | ppmw | grams | grams | grams | grams | grams | 0.017471104 |
| IRA910 | 1 | 1085.47 | 12501.67 | 610.00 | 1488.87 | 0.56 | 6.50 | 0.32 | 0.77 | 8.16 | |
| | 2 | 1057.79 | 12126.94 | 610.00 | 1739.00 | 0.55 | 6.31 | 0.32 | 0.90 | 8.08 | IRA910 |
| | 3 | 929.26 | 11915.88 | 610.00 | 1739.00 | 0.48 | 6.20 | 0.32 | 0.90 | 7.90 | Capacity |
| | 4 | 795.14 | 11402.69 | 610.00 | 1739.00 | 0.41 | 5.93 | 0.32 | 0.90 | 7.56 | (lb./cu.ft.) |
| | | | | | Avg.g | 0.50 | 6.23 | 0.32 | 0.87 | 7.92 | 3.534 |
| OFF | | Acetate | Form. | SCN | C1 | Acetate | form. | SCN | C1 | Total/pass | Avg. Total (lb) |
| (PPM) | | ppmw | ppmw | ppmw | ppmw | grams | grams | grams | grams | grams | 0.017 |
| PA412 | 1 | 523.66 | 14755.14 | 763.08 | 1864.67 | 0.27 | 0.12 | 0.16 | 6.12 | 6.67 | |
| | 2 | 351.05 | 11766.48 | 230.29 | 1743.51 | 0.18 | 0.07 | 0.20 | 5.73 | 6.18 | PA412 |
| | 3 | 835.86 | 21994.59 | 1109.61 | 4019.50 | 0.22 | 5.72 | 0.29 | 1.05 | 7.27 | Capacity Lost |
| | 4 | 1523.80 | 68399.78 | 2629.77 | 11686.39 | 0.20 | 8.89 | 0.34 | 1.52 | 10.95 | (lb./cu.ft.) |
| | | | | | Avg.g | 0.22 | 3.70 | 0.25 | 3.60 | 7.77 | 0.118 |
| | | Acetate | Form. | SCN | C1 | Acetate | form. | SCN | C1 | Total/pass | Avg. Total (lb) |
| | | ppmw | ppmw | ppmw | ppmw | grams | grams | grams | grams | grams | 0.011107712 |
| PA408 | 1 | 234.04 | 10159.08 | 323.31 | 2018.82 | 0.12 | 5.28 | 0.17 | 1.05 | 6.62 | |
| | 2 | 133.50 | 7455.68 | 0.00 | 1114.50 | 0.07 | 3.88 | 0.00 | 0.58 | 4.53 | |
| | 3 | 767.07 | 13634.68 | 1815.05 | 2713.79 | 0.20 | 3.55 | 0.47 | 0.71 | 4.92 | PA408 |
| | 4 | 1726.50 | 23117.49 | 2413.10 | 4155.44 | 0.22 | 3.01 | 0.31 | 0.54 | 4.08 | Capacity Lost |
| | | | | | Avg.g | 0.15 | 3.93 | 0.24 | 0.72 | 5.04 | (lb./cu.ft.) |
| | | | | | | | | | | | 0.898 |
| | | Acetate | Form. | SCN | C1 | Acetate | form. | SCN | C1 | Total/pass | Avg. Total (lb) |
| | | ppmw | ppmw | ppmw | ppmw | grams | grams | grams | grams | grams | 0.015 |
| IRA910 | 1 | 311.90 | 11764.08 | 413.47 | 1968.09 | 0.16 | 6.12 | 0.22 | 1.02 | 7.52 | |
| | 2 | 375.21 | 11028.03 | 382.68 | 1670.18 | 0.20 | 5.73 | 0.20 | 0.87 | 7.00 | IRA910 |
| | 3 | 758.76 | 17870.05 | 871.62 | 3647.06 | 0.20 | 4.65 | 0.23 | 0.95 | 6.02 | Capacity Lost |
| | 4 | 579.67 | 35413.46 | 1679.37 | 7899.77 | 0.08 | 4.60 | 0.22 | 1.03 | 5.92 | (lb./cu.ft.) |
| | | | | | Avg.g | 0.16 | 5.28 | 0.21 | 0.97 | 6.61 | 0.584 |

PROCESS FOR THE RECLAMATION OF SPENT ALKANOLAMINE SOLUTION

BACKGROUND OF INVENTION

The present invention relates to a process for the regeneration of ion exchange beds used in the reclamation of alkanolamine solutions. In particular, the present invention relates to a process for removing anions that build up on the resins in the ion exchange beds by purging the beds with reagents that remove the anions.

The removal of hydrogen sulfide from waste gases liberated in the course of various chemical and industrial processes, such as wood pulping, natural gas and crude oil production and petroleum refining, has become increasingly important in combating atmospheric pollution. Hydrogen sulfide containing gases not only have an offensive odor, but such gases can cause damage to vegetation, painted surfaces and wildlife, and can also constitute a significant health hazard to humans. Regulations by federal and state governments have imposed increasingly lower tolerances on the amount of hydrogen sulfide that can be vented to the atmosphere. Many localities now require the removal of virtually all the hydrogen sulfide under the penalty of a ban on continuing operation of a plant or facility which produces the hydrogen sulfide-containing gaseous stream.

Alkanolamine process units remove hydrogen sulfide ($H_2S$) and carbon dioxide ($CO_2$) from gaseous process streams, typically by countercurrently contacting an aqueous solution containing from about 20% to about 50% by weight of an alkanolamine with a gas stream containing $H_2S$ and/or $CO_2$. For the present application, it is understood that the terms "alkanolamine," "amine" and "ethanolamine" are generic terms including, but not limited to, monoethanolamine ("MEA"), diethanolamine ("DEA"), triethanolamine ("TEA"), diglycoalamine ("DGA") and methyl diethanolamine ("MDEA"). Solutions of water and one or more of the alkanolamines are widely used in industry to remove hydrogen sulfide and carbon dioxide from such gaseous streams. When gases containing hydrogen sulfide and/or carbon dioxide are contacted by a solution of an aqueous amine, the hydrogen sulfide and/or carbon dioxide dissolve in the solution to form weak acids.

$H_2S$ and $CO_2$ are not the only gases found in gas emissions which form weak acids when dissolved in water. Other such acid gases, as they are commonly called, that frequently are present in gas streams treated with alkanolamine include sulfur dioxide ($SO_2$), carbonyl sulfide (COS) and hydrocyanic acid (HCN). When contacted with a solution of an aqueous amine, these gases undergo reactions similar to $H_2S$ and $C_2$ and form alkanolamine salts. These salts, however, cannot be removed by conventional steam stripping methods that are often used to remove $H_2S$ and $CO_2$ salts and, consequently, they remain and accumulate in the system.

Another problem that is often found in alkanolamine systems occurs when oxygen gets into the alkanolamine system. Oxidation of acid gas conjugate base anions leads to the formation of other alkanolamine salts, most commonly salts of thiosulfate $S_2O_3^-$ and sulfate $SO_4^-$. Alkanolamine salts are also formed with thiocyanate ($SCN^-$) and chloride ($Cl^-$). Alkanolamine streams containing these salts also cannot be regenerated by conventional steam stripping methods. The oxidation also results in the formation of formates and acetates.

Alkanolamine salts which cannot be heat regenerated, called heat-stable salts, reduce the effectiveness of alkanolamine treating systems. The alkanolamine is protonated and cannot react with $H_2S$ and $CO_2$, which dissolve into the solution. Also, accumulated alkanolamine salts can cause corrosion in carbon steel equipment which is commonly used in amine systems. These salts are also known to cause foaming problems which further decreases treating capacity.

Corrosion in alkanolamine units significantly increases both operating and maintenance costs. The mechanisms of corrosive attack include general corrosive thinning, corrosion-erosion, and stress-corrosion cracking. Corrosion control techniques include the use of more expensive corrosion and erosion resistant alloys in the piping and vessels, continuous or periodic removal of corrosion-promoting agents in suspended solids by filtration, activated carbon adsorption, and the addition of corrosion inhibitors. (See Kohl, A. L. and Reisenfeld, F. C., Gas Purification, Gulf Publishing Company, Houston, 1979, pp. 91–105, as well as K. F. Butwell, D. J. Kubec and P. W. Sigmund, "Alkanolamine Treating," Hydrocarbon Processing, March 1982.)

The acid gas sorption capacity in a circulating alkanolamine-water system decreases with time on stream in the absence of added makeup alkanolamine and the system becomes less efficient. This performance degradation is partially attributable to the accumulation of heat stable salts in the alkanolamine-water stream. U.S. Pat. No. 4,795,565 to Yan describes a process for removing heat stable salts from an ethanolamine system by the use of ion exchange resins. The disclosure of U.S. Pat. No. 4,795,565 to Yan is incorporated herein by reference for the operating details both of an ethanolamine acid gas sorption system as well as for the heat stable salt removal process. Yan teaches that strongly acidic and basic cationic and anionic exchange resins are preferred to remove accumulated salts from ethanolamine solutions. Yan also teaches the regeneration of the ion exchange resins using a solution of $(NH_4)_2 CO_3$, $NH_4HCO_3$, $NH_4OH$ or a mixture thereof.

Various processes have been proposed for the regeneration of anion exchange resins used for the reclamation of alkanolamine solutions. U.S. Pat. No. 2,797,188 to Taylor et al. discloses methods for regenerating an alkanolamine absorbent resin bed using sodium hydroxide, either alone or in combination with sodium sulfate. In U.S. Pat. No. 5,162,084 to Cummings et al., an alkanolamine absorbent resin bed is regenerated with sulfuric acid and an alkali metal hydroxide. U.S. Pat. No. 4,970,344 to Keller, U.S. Pat. No. 5,006,258 to Veatch et al. and U.S. Pat. No. 5,788,864 to Coberly et al. disclose methods for regenerating an alkanolamine absorbent resin bed that include a water flushing step and the introduction of sodium hydroxide to remove the thiocyanate ions.

Heat stable salts may also be removed from an alkanolamine system by distillation. However, such separation has been limited in the past to relatively mild conditions of temperature and pressure to avoid thermal degradation of the alkanolamine. For example, diethanolamine ("DEA") boils at 268EC at 760 mm Hg pressure and tends to oxidize and decompose at high temperature. For this reason, vacuum distillation has not been widely used to separate heat stable salts from spent alkanolamine solutions.

The chemistry of alkanolamine degradation is discussed in the Butwell et al. article cited above. The Butwell et al. article notes that monoethanolamine ("MEA") irreversibly degrades to N) (2) hydroxyethyl) ethylene diamine ("HEED"), which has reduced acid gas removal properties and becomes corrosive at concentrations of at least about 0.4% by weight.

Diglycolamine ("DGA"), on the other hand, produces a degradation product upon reaction with $CO_2$ which exhibits different properties. DGA, a registered trademark of Texaco, Inc., identifies an amine having the chemical formula $NH_2$) $C_2H_4)OC_2H_4)OH$. DGA degrades in the presence of $CO_2$ to form N,N') bis(hydroxyethoxyethyl) urea ("BHEEU") which is similar to HEED in corrosivity but differs in that BHEEU has no acid gas removal properties.

DEA reacts with $CO_2$ to form N,N'- di(2-hydroxyethyl) piperazine. Unlike HEED and BHEEU, the piperazine compound is noncorrosive and has acid gas removal properties essentially equal to its parent, DEA. See the Butwell et al. article at page 113.

Diisopropylamine ("DIPA") readily degrades when contacted with $CO_2$ to form 3-(2-hydroxypropyl) 5-methyl oxazolidone which has essentially no acid gas removal properties. See the Butwell et al. article at page 113.

Numerous degradation products formed by the reaction of $H_2S$, or a mixture of $H_2S$ and $CO_2$ with diethanolamine have been reported from analyses of operating diethanolamine acid gas sorption processes. The complex chemistry of alkanolamine degradation may account at least in part for the unpredictable behavior of ion exchange resins for removing heat stable salts from aqueous alkanolamine solutions.

The regeneration of the ion exchange resin beds is the most difficult task for an alkanolamine reclamation process. There have been several attempts made to use ion exchange technology for reclamation in amine systems, but most have been unsuccessful due to an unacceptable regeneration process. Water treatment plants have successfully used ion exchange technology, but the total anion concentrations being removed is significantly lower and the affinity of the anions being removed is generally much less, making it easier to regenerate the ion exchange resin beds. In contrast, an amine system is exposed to very high levels of anions (as high as 45,000 ppmw) and more repetitive regeneration cycles are required to remove these anions. Also, stronger anions, such as thiocyanate and sulfate, require a different regeneration method due to the difficulty of removing these anions from the cationic sites of the strong base resin.

The methods presently being used to regenerate ion exchange resin beds in alkanolamine reclamation systems commonly requires a two stage regeneration method with the first stage utilizing a strong acid such as sulfuric acid or hydrochloric acid. These acids are difficult to handle and pose health and safety hazards to personnel and maintenance problems to the equipment due to their corrosivity. Consequently, there is a need for a process for the efficient regeneration of ion exchange beds that does not use corrosive acids.

SUMMARY OF THE INVENTION

In accordance with the present invention, a process for the reclamation of spent aqueous alkanolamine solutions. The process includes the steps of: (a) contacting a gaseous hydrocarbon stream having $H_2S$, $CO_2$, or both dissolved therein with an aqueous alkanolamine solution, whereby ions are accumulated in the aqueous alkanolamine solution to form a spent aqueous alkanolamine solution, and wherein the ions lower the acid gas sorption capacity of the spent aqueous alkanolamine solution; (b) contacting the spent aqueous alkanolamine solution with a strong base ion exchange resin having a pKa of from about 1 to about 7 for time sufficient to sorb from the aqueous alkanolamine solution at least a portion of the accumulated ions; (c) repeating steps (a) and (b) to maintain the acid gas sorption capacity of the aqueous alkanolamine solution at a substantially constant value; (d) regenerating the strong base ion exchange resin to remove unwanted ions, the regeneration including contacting the strong base ion exchange resin with a sodium chloride solution for a time sufficient to sorb the ions therefrom; and (e) repeating steps (b), (c) and (d) to maintain the ion sorption capacity of the strong base ion exchange resin at a substantially constant value.

The spent aqueous alkanolamine solution includes at least one component selected from the group consisting of monoethanolamine, diethanolamine, triethanolamine, and methyl diethanolamine. In one embodiment, the process includes a step for cooling the spent aqueous alkanolamine solution prior to contacting the solution with a strong base ion exchange resin. In another embodiment, the process includes a step for filtering the spent aqueous alkanolamine solution prior to contacting the solution with a strong base ion exchange resin. The filtration can include multiple filters, wherein at least one of the filters is a carbon filter. The filtering removes materials that tend to build up in the resin beds and decrease their cycle life. The alkanolamine solution can be analyzed downstream of the strong base ion exchange resin to determine the concentration of the ions in the solution and when the resin bed has reached a high ion concentration level. In the preferred embodiment, the process further includes both cooling and filtering steps and a step for analyzing the alkanolamine solution discharged from the resin bed.

The resin regeneration process can also include contacting the strong base ion exchange resin with a recycled sodium chloride solution, which recycles the sodium chloride that passes through the resin bed into a recycle tank and then back into the resin bed. The recycling of the sodium chloride reduces the use of fresh sodium chloride solution and the recycled solution can be repeatedly passed through the ion bed before it is spent.

In a preferred embodiment, the regeneration of the strong base ion exchange resin can include the additional steps of isolating and purging the strong base ion exchange resin prior to contacting with the sodium chloride solution, wherein the spent aqueous alkanolamine solution are substantially removed therefrom; and, after contacting with the sodium chloride solution, purging the strong base ion exchange resin, wherein the sodium chloride solution is substantially removed therefrom; contacting the strong base ion exchange resin with an alkali metal hydroxide solution for a time sufficient to convert the resin to a substantially hydroxide form; and purging the strong base ion exchange resin, wherein the alkali metal hydroxide solution is substantially removed therefrom. In a preferred embodiment, the alkali metal hydroxide solution is a sodium hydroxide solution. The alkali metal hydroxide solution can also be recycled through the resin bed in the same way as the sodium chloride is recycled.

The process can also include a step for analyzing the sodium chloride solution after it has contacted the strong base ion exchange resin to determine the concentration of ions in the solution and that the thiocyanate ions and other ions accumulated in the resin bed have been removed.

The present invention provides the advantage of using relatively inexpensive and safe sodium chloride to remove ions from resin beds instead of sulfuric acid or hydrochloric acid, which are more expensive and more dangerous to the operating personnel.

BRIEF DESCRIPTION OF THE FIGURES

FIG. 4 is a table showing the mass balance for DEA heat stable salts (HSS) and ion exchange resin DIAION PA 316.

FIG. 7 is a table showing the sorption capacities of several different resins.

DETAILED DESCRIPTION OF THE INVENTION

Figure 1:
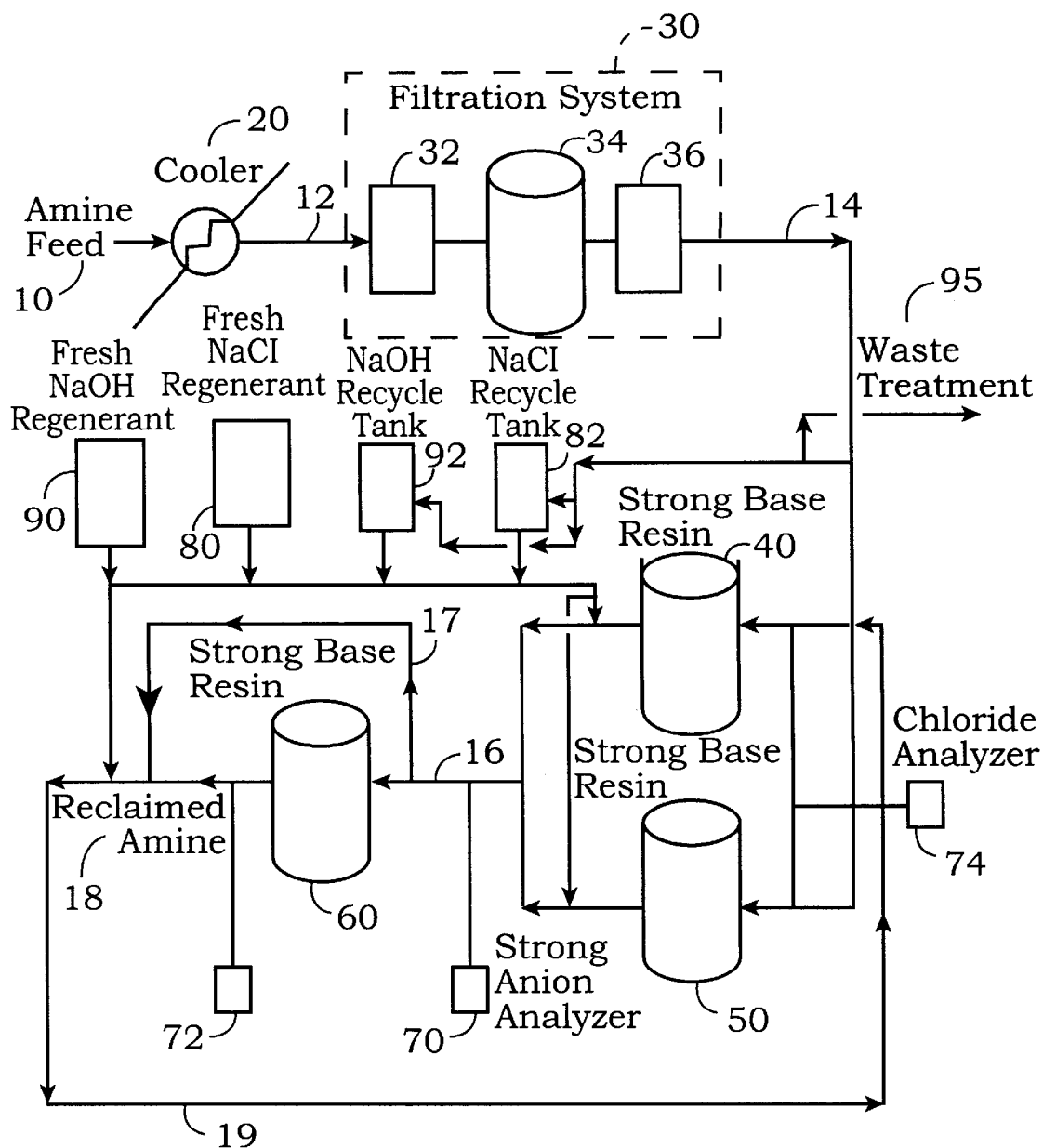
FIG. 1 is a flow diagram of a preferred embodiment of the alkanolamine reclamation process of the present invention.

The present invention provides a process for the regeneration of ion exchange resin beds that are used for the reclamation of spent alkanolamine solutions. Alkanolamine solutions used in gas treatment processes, such as $H_2S$ and $CO_2$ removal systems, sorb materials from these gases into the alkanolamine solution and form alkanolamine salts. Over a period of time, the concentration of these salts builds up in the alkanolamine solutions and the process becomes less efficient, and eventually inoperative. For the purposes of the present invention, alkanolamine solutions with accumulated salts that reduce the efficiency of the solutions in gas sorption processes are referred to as, "spent alkanolamine solutions." These spent alkanolamine solutions are reclaimed using ion exchange resin beds to remove the salts from the solution. The reclamation of spent alkanolamine solutions results in the build-up of anions on the resins in the ion exchange beds. Eventually the collected anions reduce the efficiency of the beds and, therefore, it is necessary to regenerate the resins in the bed by removing the anions.

The regeneration of the resin beds is the most difficult task in the operation of an alkanolamine reclamation system. There have been several attempts made to use ion exchange technology for reclamation in alkanolamine systems, but most have been unsuccessful due to an unacceptable regeneration process. The key to a successful ion exchange process is the regeneration process control. Water treatment plants utilize ion exchange technology, but the total anion concentration in resins used for water treatment is significantly lower and the affinity of the anions to be removed is generally much less, making it easier to regenerate the ion exchange resins. An alkanolamine system, however, is exposed to very high levels of anions (as high as 45,000 ppmw) and requires more repetitive regeneration cycles. Also, stronger anions, such as thiocyanate and sulfate, are more difficult to remove from the cationic sites of the strong base resin and require a more rigorous regeneration method.

The most common regeneration methods currently being used require a two stage process with the first stage utilizing a strong acid such as sulfuric acid or hydrochloric acid. These acids are potentially hazardous to the operating personnel and cause corrosion problems with the process equipment. The regeneration method of the present invention for this ion exchange system also utilizes a two stage regeneration of the strong base resin, but the first stage regeneration uses a sodium chloride solution (7 to 15 wt % NaCl). The NaCl provides the chloride anion as the counter ion to remove the stronger anions (thiocyanate and sulfate). NaCl can be used in the same manner as HCl because they are both strong electrolytes that fully ionize in water. NaCl has the advantages of being less hazardous to the health of the personnel operating the system and it has a lower corrosion potential, which reduces maintenance costs. NaCl solution is also significantly less expensive than any type of acid that can be used in this type of process.

The procedures employed in the process of the invention are best described by reference to the drawings. FIG. 1 shows a preferred embodiment of the process of the invention. The spent alkanolamine solution 10 containing stronger and weaker acid anions is first passed through a high efficiency filtration system 30 and then sequentially contacted with two strong base anion exchange resins 40, 50 and 60. The stronger acid anions are preferentially removed in the first strong base anion exchange resin 40, 50, which is preferably a Type I strong base resin, and the weaker acid anions are subsequently removed from the alkanolamine solution in the second anion exchange resin 60, which is preferably a Type II strong base resin. The first anion exchange resin 40, 50 is also effective in removing the weaker acid anions as well as the stronger acid anions. However, the anion exchange resin 40, 50 has such a high affinity for the stronger acid anions, in particular the thiocyanate anions, that these anions displace any weaker acid anions from the exchange resin 40, 50. In turn, the thiocyanate anion having a higher affinity for the exchange resin 40, 50 than the chloride and sulfate anions will also tend to displace these anions from the first anion exchange resin 40, 50.

The alkanolamine solution 16 leaving the first strong base anion exchange resin 40, 50, which is essentially free of thiocyanate anions is then contacted with the second strong base anion exchange resin 60 to remove the remaining anions from the alkanolamine solution 16. Contact of the alkanolamine solution 14 sequentially with the two strong base anion exchange resins 40, 50 and 60 is continued until the resins 40, 50 and 60 are spent and are ready for regeneration. The appropriate time for regeneration of the anion exchange resins 40, 50 and 60 is determined by monitoring the effluent from the ion exchange resin beds 40, 50 and 60 with strong anion analyzers 70 and 72, which measure the salts in the alkanolamine solution 16 and 18. A high strong anion measurement indicates that the resin is no longer removing the salts from the alkanolamine solution 16 and 18 and that the resins 40, 50 and 60 have to be regenerated.

A variety of ion exchange resins may be used in the process of the invention. Strong base anion exchange resins are characterized as having fixed tertiary amine anion exchange sites which are positively charged at any pH. Weak base anion exchange resins have fixed primary or secondary amine anion exchange sites. The sites are positively charged depending on the pH of the solution. At higher pH, the sites are neutral.

Type I strong base resins are those which contain amine groups. Type II strong base resins contain alkanolamine groups. Examples of strong base Type I anion exchange resins are styrene-divinylbenzene resins with quaternary ammonium groups attached to the polymer framework, such as Resintech™ SBG-1 and Sybron™ ASB-1, sold by Resintech Company. Strong base Type II anion exchange resins include styrene divinylbenzene resins with quaternary alkanolamine groups attached to the polymer framework, such as Resintech™ SBG-II and Sybron™ ASB-II, also available from Resintech Company.

Other resins which may be used include such materials as Bayer AG's Mobay™ M500, a Type I strong base anion exchange resin, which is a polystyrene resin with quaternary ammonium groups attached to the polymer framework; Rohm and Haas Amberlyst™ A-26, a Type I strong base anion exchange resin, which is a styrene-divinylbenzene copolymer with quaternary ammonium groups attached to the polymer framework and Rohm and Haas Amberline™ IRA-410, a Type II strong base amine-type anion exchange resin. Also included are Dow styrene-divinylbenzene strong base anion exchange resins having quaternary amines as their functional group. These materials are available under the DOWEX trademark.

The preceding resins are merely illustrative of useful ion exchange resins and are not intended to limit the resins which may be used in carrying out the process of the invention. For the purposes of the present invention, it is intended that any ion exchange resin used for the reclamation of spent alkanolamine solutions can be regenerated using the process disclosed herein. These resins are readily identifiable by those skilled in the art.

The process of the invention can be implemented as a batch operation, where the flow of spent aqueous alkanolamine solution is halted while the ion exchange resins undergo regeneration. The process can also be carried out continuously by providing a plurality of resin exchangers, with appropriate piping and valves, so that while one resin bed is being regenerated, another resin bed is continuing to process the spent alkanolamine solution.

Dilute regeneration solutions (i.e., sodium chloride and alkali metal hydroxide solutions) are used to remove anions from the ion exchange resins because they are less expensive than more concentrated solutions. Also, if there is a breakthrough of a regeneration solution into the alkanolamine process stream, the contamination of the alkanolamine stream will be much less than if concentrated regeneration solutions are used. However, it is within the scope of the invention to use sodium chloride solutions of up to about 25 weight percent chlorides and alkali metal hydroxide solutions of up to about 20 weight percent alkali metal hydroxide to obtain equally effective reclamation of alkanolamine solutions.

PROCESS DESCRIPTION

As shown in FIG. 1, the alkanolamine solution 10 enters the unit and is cooled to between about 70° F. and about 100° F., preferably about 100° F. by an exchanger 20. Alkanolamine solutions normally use in gas treatment processes usually operate at temperatures between 110° F. and 140° F., which is too hot for the ion exchange resins. Therefore, the alkanolamine solution 10 has to be cooled in order to protect the resin structure. The temperature of the alkanolamine solution 10 is, preferably, cooled to a temperature at which the resin can operate without being damaged. Thus, the temperature will vary according to the operating temperature of the resin. The present invention can operate at lower temperatures, but since the alkanolamine solution has to be reheated before it is returned to service, excessive cooling is inefficient and it is preferred that the operating temperature for the process be maintained as high as the temperature limits of the resins will permit.

The quantities of the various regenerant streams, i.e. sodium chloride solution, alkali metal hydroxide solution and water employed in carrying out the process depend on the type and amount of ion exchange resin used and the composition of the alkanolamine solution being reactivated. The amounts of sodium chloride solution and alkali metal hydroxide solution used also varies depending on the concentrations of these materials. The quantities and the flow rates employed are readily determined for each operation and such calculations are within the skill of the art.

Filter System

The cooled alkanolamine solution 12 is sent through a high efficiency, multi-stage filtration system 30, which removes particles that otherwise would decrease the efficiency of the ion exchange resins. The first filter contacted is a particulate filter 32 that removes particles in the range of 5 micron and larger. These particles can foul the succeeding carbon filter 34 and eventually the resin beds 40, 50 and 60. The second filter contacted is a carbon bed adsorber 34, which uses activated carbon to adsorb any hydrocarbons and other organic materials that may be present in the system. The carbon bed adsorber 34 is necessary to protect the resin from organic fouling, which diminishes ion exchange performance. The final filter contacted is another particulate filter 36. This filter 36 removes particulates in the 10 micron range and protects the resin beds 40, 50 and 60 from any carbon that may have escaped the carbon bed adsorber 34, which is a common problem in this type of system.

Ion Exchange System

Stage One

The cooled and filtered alkanolamine solution 14 is passed through a two stage ion exchange system. The first stage consists of two Type I strong base ion exchange resin beds 40 and 50. These beds 40 and 50 are run in parallel to maintain a continuous operation with one bed in operation and the second bed undergoing regeneration or in a standby mode. When continuous operation is not desired, a single resin bed 40 can be used. (For the purposes of the present description, resin bed 40 is initially in operation and resin bed 50 is in the standby mode.) A Type I strong base resin was chosen for the first ion exchange resin beds 40 and 50 because of its high selectivity towards the stronger anions, such as thiocyanate and sulfate. These stronger anions are difficult to remove from alkanolamine solutions and after they have been removed by the Type I strong base resin, it requires a rigorous regeneration process to remove the anions from the resin.

After a steady state process is achieved in the system, Type I strong base resin bed 40 acts as a "guard bed" to protect the second stage ion exchange bed 60 from the stronger anions in the alkanolamine solution 14. The first stage bed 40 is operated until its ion sorption capacity is reached and strong anion breakthrough is detected in the alkanolamine stream 16 downstream of the resin bed 40. Strong anion breakthrough is detected using a strong anion analyzer 70, which is more accurate than a conductivity meter because it focuses on the specific anions that are present within an alkanolamine solution. Conductivity meters are commonly used in ion exchange processes, but they are not as accurate as an ion specific analyzer and, therefore, increases the potential for anion breakthrough. When breakthrough is detected by the strong anion analyzer 70, the spent resin bed 40 begins a regeneration cycle. It is critical that the operating Type I strong base resin bed 40 be taken out of service and regenerated at the first sign of strong anion breakthrough. If strong anions are allowed to pass through the first stage resin bed 40, the second stage ion exchange resin bed 60 will spend prematurely and the overall efficiency of the system will be significantly reduced.

Stage Two

The alkanolamine stream 16 from the first stage is sent to the second stage, which includes a Type II strong base resin bed 60. A Type II strong base resin is preferred because it can be easily regenerated and because it can operate in the pH range of the alkanolamine solution 16. The Type II resin is used to remove a portion of the remaining anions such as formate and acetate that were not removed in the first stage. The Type II strong base resin bed 60 continues to operate until full ion capacity is reached. A second strong anion analyzer 72 detects a high anion level in the alkanolamine stream 18 downstream of the second stage resin bed 60. When a high anion level is detected, the alkanolamine stream 16 is bypassed 17 around the resin bed 60. The resin bed 60 is not protecting any downstream equipment and, therefore, the alkanolamine stream can bypass the Type II strong base resin bed 60 while the resin bed 60 is being regenerated. Once regenerated, the resin bed 60 is placed back in service.

In one embodiment of the present invention, a recycle loop 19 is provided to recycle the alkanolamine stream 18 downstream of the second stage resin bed 60 to a pont in the process upstream of the first stage resin beds 40 and 50. The alkanolamine stream 18 can be recycled when the strong anion analyzer 72 detects a high level of strong anions or when the second stage resin bed 60 is being regenerated.

The following examples are two embodiments of the regeneration method of the present invention and provide a more complete description of specific aspects of the present invention:

EXAMPLE 1

Single-Step Regeneration (Stage Two)

This example describes the procedure for the regeneration of the second stage ion exchange bed 60 when the first stage ion exchange beds 40 and 50 are not regenerated. Type II strong base resin is easier to regenerate than Type I strong base resin and, therefore, a less rigorous regeneration cycle is used. The regeneration cycle begins by closing the inlet valve to the resin bed 60 and flushing the resin bed 60 with a water purge (a nitrogen purge can also be used) to remove any remaining amine. The purged amine is sent back into the alkanolamine system through the resin bed discharge line 18. After the amine solution is removed, the resin bed 60 is regenerated by countercurrently passing a metered solution of five to ten weight percent (5–10 wt %) fresh sodium hydroxide 92 through the resin bed 60. The sodium hydroxide regeneration stream is passed through the resin bed for approximately 15 minutes and the discharge is sent to Waste Treatment. The regeneration time is a fixed time based on the concentration and flow rate of the regenerant and the volume of the resin. After the regeneration cycle is complete, the a water stream (nitrogen can also be used) purges the sodium hydroxide solution from the resin bed 60 and the discharge is sent to waste treatment. This completes the regeneration cycle and the resin bed 60 is ready to be placed back into operation.

EXAMPLE 2

Two-Step Regeneration (Stage One)

This example describes the procedure for the regeneration of one of the first stage ion exchange beds 40 and 50 when the second stage ion exchange bed 60 is not regenerated. The regeneration of the first stage ion exchange beds 40 and 50 is more rigorous than the regeneration of the second stage bed 60 because of the high affinity of the stronger anions collected in the first stage beds 40 and 50. The regeneration cycle described in this example can also be used for the second stage ion exchange bed 60. However, using this regeneration cycle for can shorten the resin life and efficiency of the second stage ion exchange resin and should only be used when excessive amounts of strong anions are detected in the second stage resin bed 60 by the strong anion analyzer In this example, ion exchange bed 40 is in operation and ion exchange bed 50 is in a standby mode. The regeneration cycle for the first stage strong base resin bed 40 is initiated when the strong anion analyzer 70 detects a high anion level, indicating that the resin is spent. The regeneration cycle begins by taking the ion exchange bed 40 out of service and placing the standby ion exchange bed 50 in service. (A complete description of the opening and closing of the valves used to isolate the resin bed 40 and to control the flows of regenerants during the regeneration cycle is not provided herein because it is considered to be well within the understanding of those skilled in the operation of alkanolamine reclamation systems.)

The spent ion exchange bed 40 is flushed of amine by a water purge (nitrogen can also be used). After the alkanolamine is removed, the spent bed 40 is regenerated by countercurrently passing regenerants through the bed 40 in two steps. First, a seven to fifteen weight percent (7–15 wt %) a fixed amount of sodium chloride (NaCl) solution from the sodium chloride recycle tank 82 is passed through the resin bed 40 and the discharge is to waste treatment. The NaCl regenerates a large percentage of the resin bed 40 as the chloride anion in the NaCl solution acts as a counter anion and removes the stronger anions, such as thiocyanate and sulfate, from the resin. The discharge line 95 to the waste treatment system is then closed off and a sodium chloride recycle loop, which countercurrently recycles sodium chloride through the resin bed 40, is commissioned. The sodium chloride recycle loop continues in operation until the chloride analyzer 74 detects a high chloride concentration in the recycle stream downstream of the resin bed 40. When a high chloride concentration is detected, the sodium chloride recycle is discontinued and a stream of fresh sodium chloride solution from tank 80 is sent through the resin bed 40. The discharge from the resin bed 40 of the fresh sodium chloride solution stream is sent to the NaCl recycle tank 82 until the amount of recycled NaCl sent to the waste treatment system is replaced. This prevents a build-up in the concentration of unwanted anions in the NaCl recycle tank 82. The fresh sodium chloride solution is used as a polisher. This completes the first step of the regeneration cycle.

The resin in the ion exchange bed 40 is now in the chloride form and needs to be converted to the hydroxide form before it is ready to be placed back in service. The second step begins with the removal of the sodium chloride solution by purging the bed 40 with water (nitrogen can also be used) in the countercurrent direction. After the bed 40 is purged, a fixed amount of recycled NaOH solution from the sodium hydroxide recycle tank 92 is flushed through the resin bed 40 in the counter process flow direction and discharged to the waste treatment system 95. The recycled NaOH solution transforms a large percentage of the resin in the bed to the hydroxide form. The discharge line to the waste treatment system 95 is then closed and a recycle loop is commissioned, which recycles the NaOH solution that passes through the resin bed 40 back into the NaOH recycle tank 92 and completes the counter ion exchange. After about 15 minutes, the NaOH recycle is discontinued and a metered stream of five to ten weight percent (5–10 wt %) sodium hydroxide (NaOH) solution from the fresh sodium hydroxide tank 90, is passed through the bed 40 in the counter process flow direction. This NaOH stream is discharged into the recycle tank 92 to return the recycled NaOH solution in the NaOH recycle tank 92 to its original level. The resin bed 40 is then purged with water (nitrogen can also be used) to remove the sodium hydroxide solution. This completes the second step of the regeneration cycle. The resin is now in the hydroxide form and the bed 40 is ready to be placed back into service.

The alkali metal hydroxide which is used to complete the regeneration process by removal of the chloride ion from the Type I strong base anion exchange resin is preferably sodium hydroxide; however, other alkali metal hydroxides such as potassium hydroxide or lithium hydroxide may also be used. The alkali metal hydroxide can be used at ambient temperature, although higher temperatures (between about 90° F. and about 110° F.) are preferred since higher temperatures minimize the amount of cooling of the alkanolamine stream that is required. The alkali metal hydroxides used in the regeneration process will usually have a metal hydroxide concentration (based on the total water and hydroxide present) of between about 10 and about 25 weight percent and preferably between about 10 and about 15 weight percent. Depending on the concentration of the alkali metal hydroxide and the amount of chloride on the resin, the quantity of alkali metal hydroxide used in the regeneration can vary from about 30 to about 40 pounds NaOH equivalent per cubic foot of the Type I strong base anion exchange resin.

The chloride analyzer 74 optimizes the amount of sodium hydroxide used in the process. The chloride analyzer 74 monitors the chloride concentration in the NaOH recycle stream and determines when the chlorides have been removed from the resin bed 40 and the NaOH recycle can be discontinued. This is very important to the process because residual chlorides cannot be introduced into the amine system at high concentrations due to its corrosive nature.

EXAMPLE 3

A pilot plant ion exchange amine reclamation system was constructed and used to test various resin types and regeneration procedures. The unit had the same configuration as the system shown in FIG. 1, except that it did not include a heat exchanger 20 to cool the feed since the temperatures of the alkanolamine solutions tested were below 100° F. Twenty-liter containers were filled with either refinery amine or regenerant solution and used in the experiments. Ion chromatography ("IC") and Visual Spectroscopy Colorimetric ("VSC") tests were performed on samples of the amine and regenerant taken during experimentation. The prominent ions that were detected in the amine system and which form the problematic heat stable salts (HSS) are listed in decreasing affinity: thiocyanate, thiosulfate, formate, and acetate. Removal of these ions is the focus of the process of the present invention.

A Type I strong base resin has a quaternary ammonium as the exchange group that exhibits strong basicity. This exchange group is strong enough to not only absorb free floating anions but also to break neutral salts, such as HSS. Due to the high pH of the system, most of the anions present exist as neutral salts. A strong base resin is required in order to split these salts and remove the anions. However, the sorption strength of the strong base resin makes it difficult to regenerate the resins. Several Type I resins were tested and PA-316 (manufactured by Mitsubishi Chemical Corporation) was found to provide the best results. The PA-316 resin also tested for performance and reliability.

Several regeneration methods were tested for the strong base Type I resin and the two-step regeneration process was found to be the most effective. Once the stronger affinity anions are removed, the amine stream moves to a second bed to remove the lower affinity ions. A weak base resin was initially recommended. The primary to tertiary amino groups of the weak base resin exhibit a weak basicity, which theoretically should have removed the lower affinity anions. However, when tested, the resin performed poorly. It was determined that the pH of the amine solution (in most cases between about 9 and 10.5 pH) strips the active sites on the resin of their charge, thus prohibiting ion exchange. In addition, the weak basicity of the Type I resin is not enough to break neutral salts, such as HSS, which is necessary for this process.

Strong base Type II resins were used in several regeneration processes. The strong base Type II resin has similar characteristics and structure as the Type I resin, but exhibits a slightly weaker basicity. The weaker basicity allows the Type II resin to remove lower affinity anions and remain operable in the 9 to 10.5 pH range of the amine system. The Type II resin has a lower affinity for the anions than the Type I resin and consequently the Type II resin was found to regenerate more easily. Several Type II resins were tested and PA-412 (manufactured by Mitsubishi Chemical Corporation) provided the best results. PA-412 was then tested for performance and reliability.

Stage One: Strong Base Type I Resin

Figure 2:
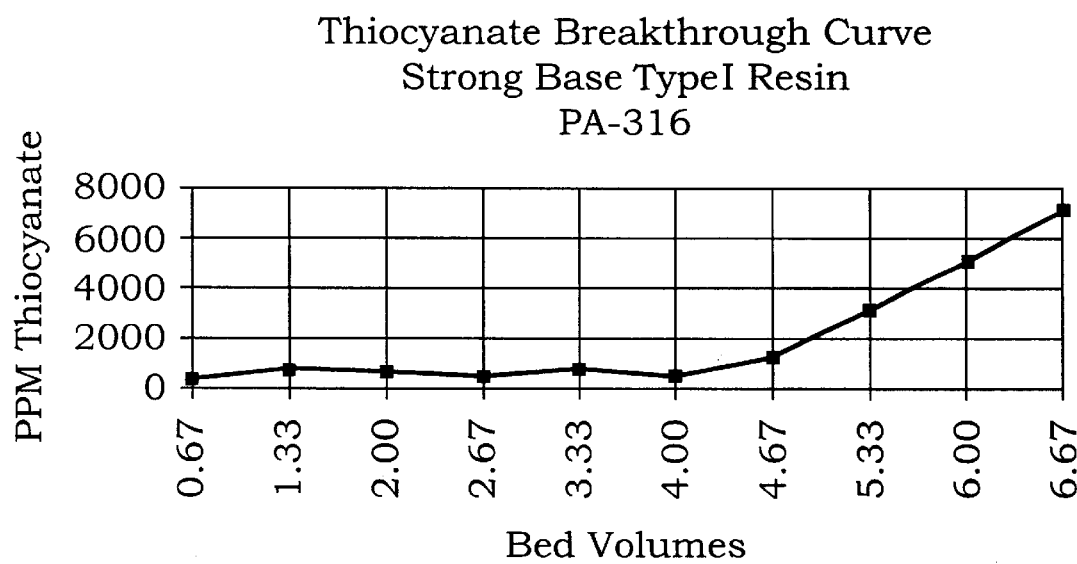
FIG. 2 is a graph of a thiocyanate breakthrough curve which shows the concentration of thiocyanate versus amine flow through a strong base Type I resin bed expressed in bed volumes.
Figure 3:
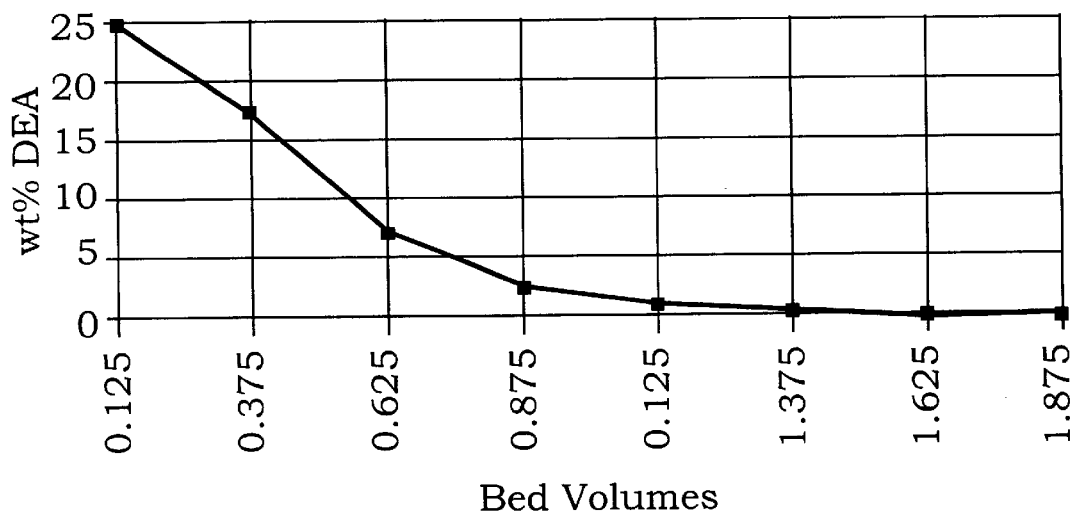
FIG. 3 is a graph of amine concentration in a strong base Type I resin bed versus water purge flow expressed in bed volumes.

Thiocyanate has the strongest affinity of the HSS ions and is the most difficult ion to remove from the amine stream and from the resins during the regeneration process. Accordingly, the first stage of the ion exchange system is designed to remove thiocyanate ions from the amine stream. After extensive testing, a "Thiocyanate Breakthrough Curve" (i.e., the detection of high thiocyanate levels downstream of the ion exchange bed) was prepared and the results are shown in FIG. 2. For PA-316, thiocyanate breakthrough occurs at approximately four to six (4–6) bed volumes of highly concentrated HSS amine solution (approximately 8000 ppmw thiocyanate). After thiocyanate breakthrough was detected and the regeneration cycle was initiated, a water purge was used to remove the amine from the resin bed. FIG. 3 shows a graph of the weight percent of DEA solution in the resin bed versus the water purge amount expressed as bed volumes. Samples of the water purge discharged from the resin bed were analyzed and it was found that one to two (1–2) bed volumes were needed to completely displace the amine from the resin.

A "Resin Capacity Table" (i.e., the capacity of the resin to sorb ions from the amine stream) was prepared and the results are shown in FIG. 4. The terms "on" and "off" which are used in this table refer to the amount of material that was absorbed "on" to the resin and the amount of material that was desorbed "off" the resin. PA-316 has a capacity of approximately 0.040 lb-mcl (2.32 lbs) thiocyanate per cubic foot of resin.

Figure 5:
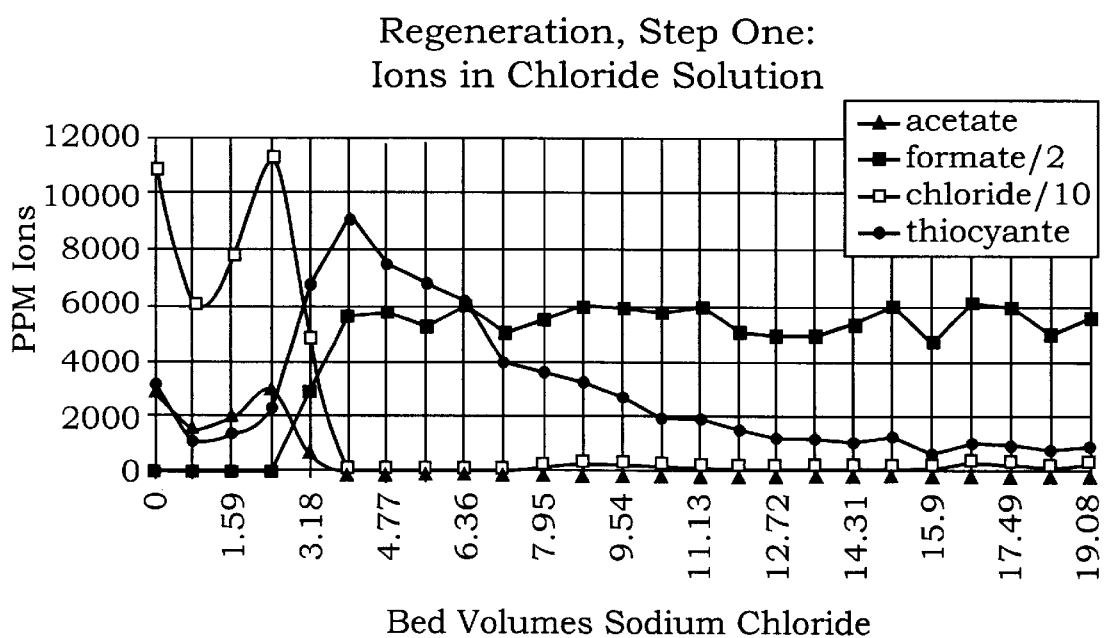
FIG. 5 is a graph showing the ion concentrations in the first stage resin bed versus flow of NaCl solution expressed in bed volumes.

Various regeneration processes were tested and it was found that sodium hydroxide regenerant alone was unable to remove the strong affinity thiocyanate ions loaded on the Type I resin. However, a two-step regeneration process was found to be effective in removing most of the thiocyanate ions from Type I resin. In the first step, a sodium chloride (NaCl) solution was passed through the resin bed in the counter process flow direction. A nine weight percent (9 wt %) NaCl solution was sufficient, based on effectiveness, cost, and availability. The first four to six (4–6) bed volumes of NaCl displaced most of the thiocyanate ions from the resins. The remaining ions were more difficult to remove and required larger amounts of regenerant. FIG. 5 shows a graph of the concentration of the ions being removed from the resins in parts per million (ppm) versus the volume of NaCl solution passed through the bed expressed in bed volumes (i.e., the volume of the resin bed).

It was found that the NaCl solution could be recycled through the resin bed with only a minimal loss of ion removal efficiency. Recycling the NaCl solution reduced the amount of NaCl solution that was needed and provided a substantial savings on the regenerant. The recycle loop included an NaCl recycle tank. NaCl solution discharged from the resin bed was sent to the tank and then pumped back through the resin bed continuously, until the ion level in the resin bed reached the desired level. After the NaCl solution flushing step was completed, the NaCl solution remaining in the resin bed was displaced by use of a one to two (1–2) bed volume water purge.

Figure 6:
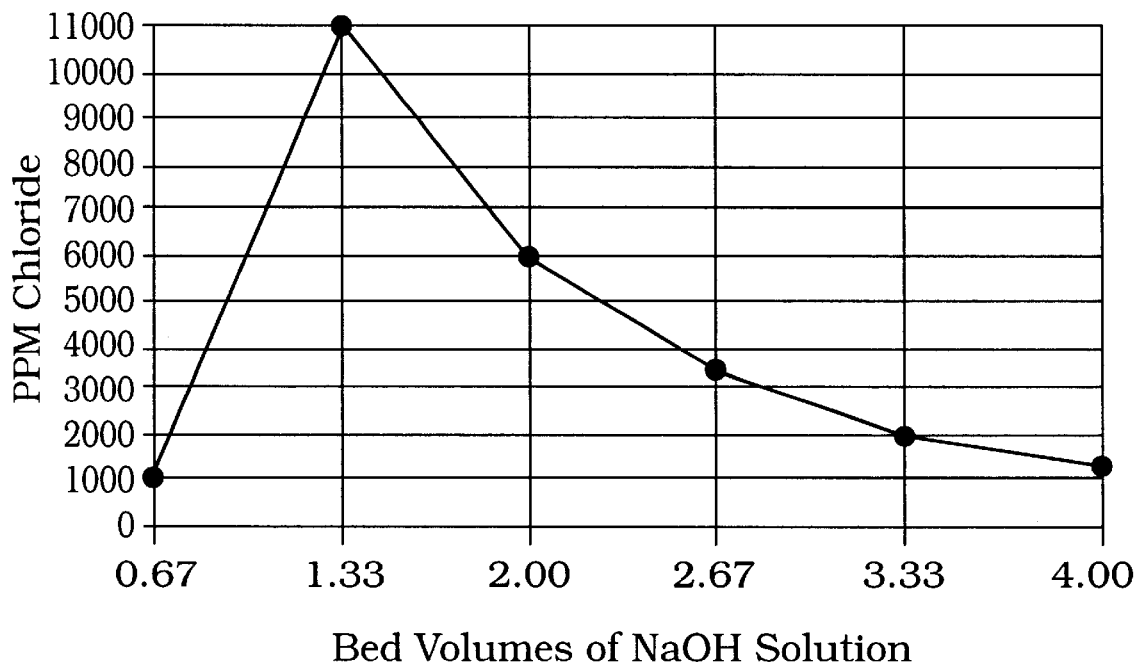
FIG. 6 is a graph showing chloride concentration in a resin bed versus flow of NaOH solution expressed in bed volumes.

The NaCl solution loads the resin bed with chloride ions, transforming the resin to its originally shipped chloride form. The resin cannot stay in this form when the amine is reintroduced to the resin bed, because the thiocyanate will load the resin and displace the chloride into the amine solution. This is unacceptable since the chlorides adversely effect the operation of the amine system. Therefore, the second step of the regeneration process uses a sodium hydroxide solution (NaOH) to displace the chloride ions from the resin bed. A nine weight percent (9 wt %) sodium hydroxide solution (NaOH) was found to produce the best results, based on effectiveness, cost, and availability. FIG. 6 shows that approximately three to four (3–4) bed volumes of NaOH are required to reduce the chloride ions in the resin bed to acceptable levels. Once more, a regenerant recycle loop was found to be cost effective. After a sufficient amount of the NaOH solution passes through the resin bed, the resin was transformed into the its hydroxide form. Finally, the NaOH solution was displaced from the resin bed using a one to two (1–2) bed volume water purge. The resin bed was then ready to be placed back in operation.

Stage Two: Strong Base Type II Resin

The second stage of the ion exchange system removes the remaining anions, i.e., formate, acetate, etc., from the amine stream. A Type II strong base resin (PA-412) was used and its capacity was determined to be approximately 0.060 lb-mol (3.58 lbs) anions per cubic foot of resin (see FIG. 7, last column on the right). This means that 3.58 pounds of anions were absorbed onto a cubic foot of resin. The data in the last column on the right of FIG. 7 shows the capacity of the resin that was lost when the anions were removed. For PA-412, 0.0118 lbs per cubic foot of "capacity lost." This indicates amount of resin that was lost by the regeneration process.

Anion breakthrough is not a primary concern for the second stage resin bed because there are no downstream ion beds that can be harmed by a if the discharge from the resin bed has a high concentration of anions. The regeneration of the second stage resin beds is preformed on a either a scheduled basis or when high ion concentrations are detected in the amine stream discharged from the resin bed. The regeneration cycle begins with a water purge that removes amine from the bed. This purge is similar to the Type I strong base purge and uses one to two (1–2) bed volumes of water. It was found that a single step regeneration process using a five weight percent (5 wt %) sodium hydroxide solution (NaOH) solution is adequate to remove the anions from the resin bed. The tests showed that the first five to seven (5–7) bed volumes of NaOH solution displaced almost all the anions from the bed. Due to this efficient expulsion of anions, a recycle loop was found to be unnecessary. The NaOH regenerant solution was removed from the bed using a one to two (1–2) bed volume water purge. The second stage resin bed was then ready to be placed back in operation.

The test showed that over time, the second stage resin bed unavoidably load up with thiocyanate ions due to the leakage of ions from the first stage of the ion exchange system. The thiocyanate ions have the strongest affinity for the Type II resins and cannot be completely removed using NaOH solution in a single stage process. Therefore, a two step regeneration process that includes both a NaCl regenerant solution and a NaOH regenerant solution (the same process that is used for the strong base Type I resin) must be used to remove the thiocyanate ions. How frequently the two step regeneration process is required will depend on the levels of thiocyanate leakage from the first stage and the degree of performance degradation in the second stage resin bed. After the regeneration is completed, the resin bed is ready to be placed back in operation.

After conducting tests and analyzing the data, it was determined that the most efficient design includes a PA-316 strong base Type I resin in the first stage resin bed and PA-412 strong base Type II resin in the second stage of the ion exchange system. The two step regeneration process using sodium chloride and sodium hydroxide as regenerant solutions provided the most effective process for regenerating the first stage resin bed containing strong base Type II resin. The single step regeneration process using a sodium hydroxide regenerant solution was found to provide the most effective process for regenerating the second stage resin bed containing strong base Type I resin. It was also found that the second stage resin beds required periodical regeneration using the two step regeneration process to remove thiocyanate ions that accumulated over time.

EXAMPLE 4

Figure 8:
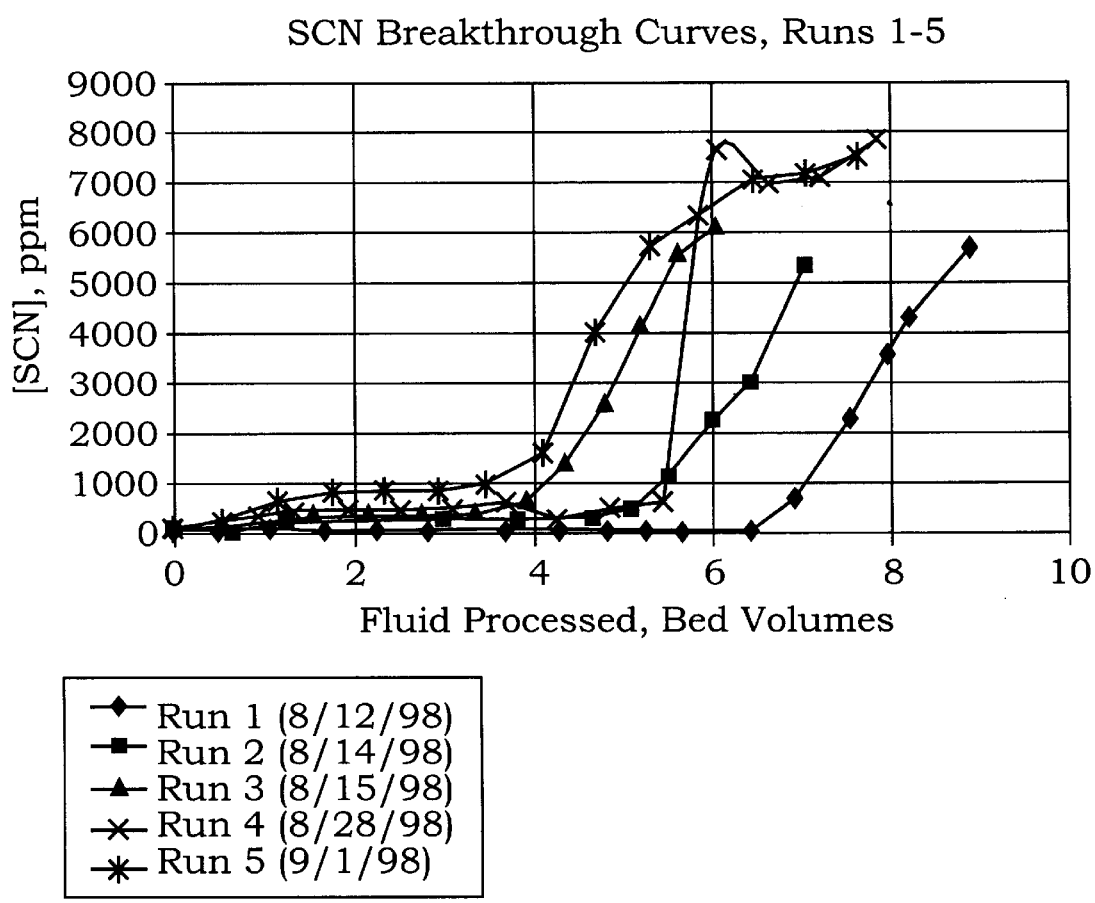
FIG. 8 is a graph of a thiocyanate breakthrough curve which shows the concentration of thiocyanate versus amine flow expressed in bed volumes.
Figure 9:
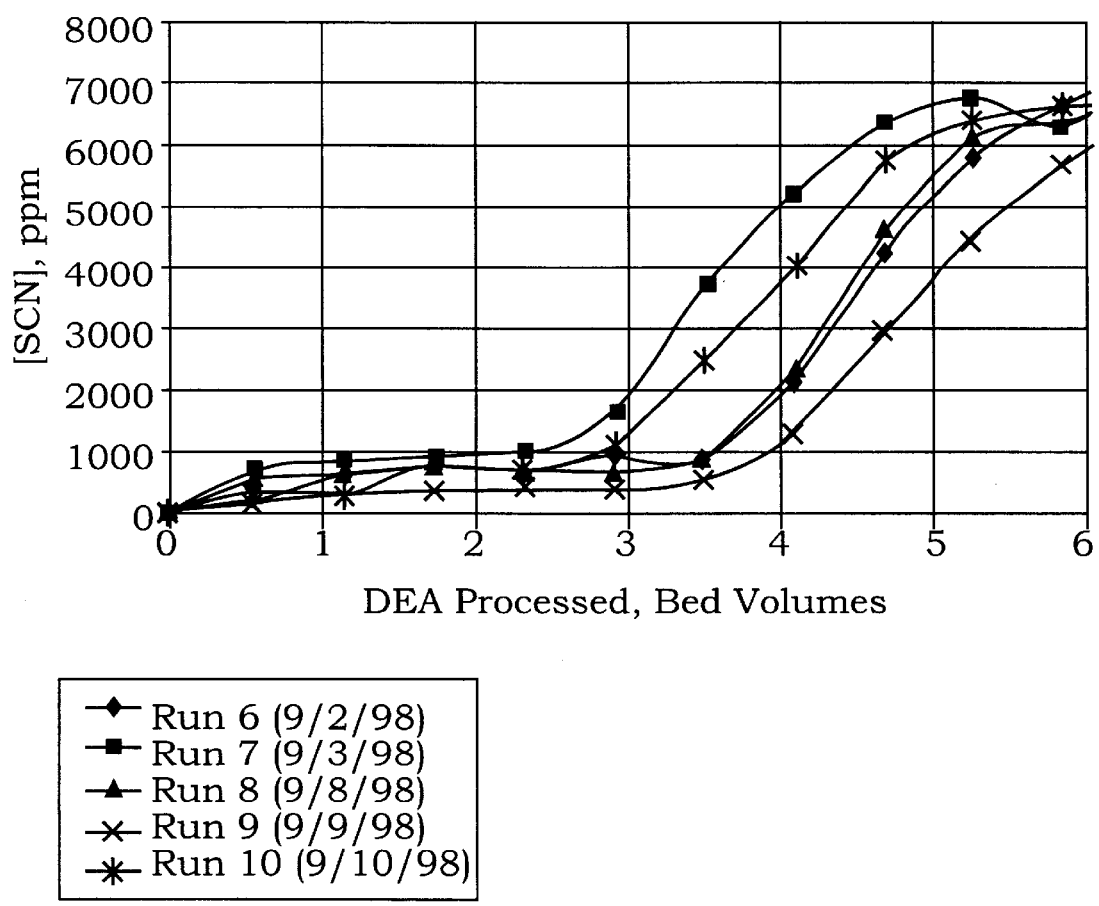
FIG. 9 is a graph of a thiocyanate breakthrough curve which shows the concentration of thiocyanate versus DEA flow expressed in bed volumes.

FIGS. 8 and 9 show graphs of the Thiocyanate Breakthrough Curves for the first ten runs of the pilot plant ion exchange amine reclamation system described in Example 3. The graphs show the number of bed volumes of amine solution that are treated in the unit before thiocyanate breakthrough is detected. After each run, the resin bed was regenerated. For the first five runs (FIG. 8), breakthrough does not occur until after about four bed volumes of amine solution is processed. For runs six to ten (FIG. 9), about three bed volumes of DEA are processed before breakthrough is detected. The graphs show that the system is performing well as evidenced by the repetitive curves, which indicate that after the regeneration process the system operates with no significant degradation of the resin.

While there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. A process for the reclamation of spent aqueous alkanolamine solutions comprising the steps of:
   (a) contacting a gaseous hydrocarbon stream having $H_2S$, $CO_2$, or both dissolved therein with an aqueous alkanolamine solution, whereby ions are accumulated in said aqueous alkanolamine solution to form a spent aqueous alkanolamine solution, wherein said ions lower the acid gas sorption capacity of said aqueous alkanolamine solution;
   (b) contacting said spent aqueous alkanolamine solution with a strong base ion exchange resin having a pKa of from about 1 to about 7 for time sufficient to sorb from said aqueous alkanolamine solution at least a portion of said accumulated ions;
   (c) repeating steps (a) and (b) to maintain said acid gas sorption capacity of said aqueous alkanolamine solution at a substantially constant value;
   (d) regenerating said strong base ion exchange resin to remove unwanted ions, said regeneration comprising contacting said strong base ion exchange resin with a sodium chloride solution for a time sufficient to sorb said ions therefrom; and
   (e) repeating steps (b), (c) and (d) to maintain said ion sorption capacity of said strong base ion exchange resin at a substantially constant value.

2. The process for the reclamation of a spent aqueous alkanolamine solution according to claim 1, wherein said alkanolamine comprises at least one component selected from the group consisting of monoethanolamine, diethanolamine, triethanolamine, and methyl diethanolamine.

3. The process for the reclamation of a spent aqueous alkanolamine solution according to claim 1, further comprising cooling said spent aqueous alkanolamine solution prior to contacting said solution with a strong base ion exchange resin.

4. The process for the reclamation of a spent aqueous alkanolamine solution according to claim 1, further comprising filtering said spent aqueous alkanolamine solution prior to contacting said solution with a strong base ion exchange resin.

5. The process for the reclamation of a spent aqueous alkanolamine solution according to claim 3, further comprising filtering said spent aqueous alkanolamine solution after cooling and prior to contacting said solution with a strong base ion exchange resin.

6. The process for the reclamation of a spent aqueous alkanolamine solution according to claim 1, wherein said regeneration further comprises contacting said strong base ion exchange resin with a recycled sodium chloride solution.

7. The process for the reclamation of a spent aqueous alkanolamine solution according to claim 1, wherein said regeneration of said strong base ion exchange resin further comprises:
   isolating said strong base ion exchange resin prior to contacting with said sodium chloride solution;
   purging said isolated strong base ion exchange resin prior to contacting with said sodium chloride solution, wherein said spent aqueous alkanolamine solution are substantially removed therefrom;
   purging said strong base ion exchange resin after contacting with said sodium chloride solution, wherein said sodium chloride solution is substantially removed therefrom;
   contacting said strong base ion exchange resin with an alkali metal hydroxide solution, after purging said sodium chloride solution therefrom, for a time sufficient to convert said resin to a substantially hydroxide form; and
   purging said strong base ion exchange resin, wherein said alkali metal hydroxide solution is substantially removed therefrom.

8. The process for the reclamation of a spent aqueous alkanolamine solution according to claim 1, further comprising analyzing said aqueous alkanolamine solution after contacting said strong base ion exchange resin.

9. The process for the reclamation of a spent aqueous alkanolamine solution according to claim 1, further comprising analyzing said sodium chloride solution after contacting said strong base ion exchange resin.

10. The process for the reclamation of a spent aqueous alkanolamine solution according to claim 7, wherein said alkali metal hydroxide solution is a sodium hydroxide solution.

* * * * *